(12) United States Patent
Ko et al.

(10) Patent No.: US 11,545,709 B2
(45) Date of Patent: Jan. 3, 2023

(54) RECHARGEABLE BATTERY

(71) Applicant: SAMSUNG SDI CO., LTD., Yongin-si (KR)

(72) Inventors: Heejung Ko, Yongin-si (KR); Kijung Kim, Yongin-si (KR); Yongjin Park, Yongin-si (KR); Byongchul Woo, Yongin-si (KR); Jong-Ha Lee, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 0 days.

(21) Appl. No.: 17/139,261

(22) Filed: Dec. 31, 2020

(65) Prior Publication Data
US 2021/0399373 A1 Dec. 23, 2021

(30) Foreign Application Priority Data
Jun. 18, 2020 (KR) ........................ 10-2020-0074398

(51) Int. Cl.
*H01M 50/193* (2021.01)
*H01M 50/181* (2021.01)
(Continued)

(52) U.S. Cl.
CPC ..... *H01M 50/193* (2021.01); *H01M 10/0427* (2013.01); *H01M 50/109* (2021.01); *H01M 50/154* (2021.01); *H01M 50/181* (2021.01)

(58) Field of Classification Search
CPC ......... H01M 10/0426; H01M 10/0427; H01M 10/0422–0427; H01M 50/193;
(Continued)

(56) References Cited

U.S. PATENT DOCUMENTS

| 6,159,630 A | 12/2000 | Wyser | |
|---|---|---|---|
| 2017/0207491 A1* | 7/2017 | Tamachi | ............. H01M 50/543 |

(Continued)

FOREIGN PATENT DOCUMENTS

| GB | 1 544 711 A | 4/1979 | |
|---|---|---|---|
| JP | 2001307715 A * | 11/2001 | .......... H01M 2/0207 |
| WO | WO-2020004412 A1 * | 1/2020 | ........... C08G 63/183 |

OTHER PUBLICATIONS

Machine translation of specification of JP2001307715A (Year: 2001).*

(Continued)

*Primary Examiner* — William E McClain
*Assistant Examiner* — Jason Barton
(74) *Attorney, Agent, or Firm* — Lewis Roca Rothgerber Christie LLP

(57) ABSTRACT

A rechargeable battery includes: an electrode assembly including a first electrode, a second electrode, and a separator between the first electrode and the second electrode; a case configured to be connected to the first electrode and accommodate the electrode assembly, and including an opening to expose the electrode assembly; a cap plate configured to be coupled to the case to cover an outer area of the opening, and including a through-hole to expose a central area of the opening; a terminal plate configured to cover the through-hole and to be connected to the second electrode; and a thermal-fusion layer configured to be arranged between the cap plate and the terminal plate and to insulation-bond the cap plate and the terminal plate, and the thermal-fusion layer includes a plurality of layers including a thermoplastic resin layer.

11 Claims, 5 Drawing Sheets

(51) Int. Cl.
*H01M 50/109* (2021.01)
*H01M 50/148* (2021.01)
*H01M 10/04* (2006.01)

(58) Field of Classification Search
CPC ............. H01M 50/181; H01M 50/109; H01M 10/287; H01M 10/123–125; H01M 2010/0495; H01M 50/559; H01M 50/56; H01M 50/153; H01M 50/154; H01M 50/183; H01M 50/197; Y02E 60/10; Y02P 70/50; Y02T 10/70
See application file for complete search history.

(56) References Cited

U.S. PATENT DOCUMENTS

2021/0091435 A1* 3/2021 Muraki ................. C09D 181/04
2021/0359362 A1* 11/2021 Wang .................. H01M 50/181

OTHER PUBLICATIONS

European Search Report for corresponding European Patent Application No. 21165319.1, European Search Report dated Aug. 26, 2021 (6 pgs.).

* cited by examiner

RECHARGEABLE BATTERY

CROSS-REFERENCE TO RELATED APPLICATION

This application claims priority to and the benefit of Korean Patent Application No. 10-2020-0074398, filed on Jun. 18, 2020 in the Korean Intellectual Property Office, the entire content of which is incorporated herein by reference.

BACKGROUND

1. Field

Aspects of embodiments of the present disclosure relate to a rechargeable battery.

2. Description of the Related Art

Generally, a rechargeable battery is a battery that may be repeatedly charged and discharged.

Recently, as the demand for wearable devices, such as headphones, earphones, smartwatches, and body-attached medical devices using wireless communication such as Bluetooth, increases, the need for ultra-small rechargeable batteries to be mounted on the wearable devices is increasing.

Such an ultra-small rechargeable battery has a risk of explosion due to an increase in internal temperature and pressure when an unintended event occurs therein.

The above information disclosed in this Background section is only for enhancement of understanding of the background of the invention, and, therefore, it may contain information that does not form the prior art that is already known in this country to a person of ordinary skill in the art.

SUMMARY

According to an aspect of one or more embodiments, a rechargeable battery in which a risk of explosion may be suppressed, even if a temperature and pressure are unintentionally increased inside the rechargeable battery, is provided.

According to one or more embodiments, a rechargeable battery includes: an electrode assembly including a first electrode, a second electrode, and a separator between the first electrode and the second electrode; a case configured to be connected to the first electrode and accommodate the electrode assembly, and including an opening to expose the electrode assembly; a cap plate configured to be coupled to the case to cover an outer area of the opening, and including a through-hole to expose a central area of the opening; a terminal plate configured to cover the through-hole and to be connected to the second electrode; and a thermal-fusion layer configured to be arranged between the cap plate and the terminal plate and to insulation-bond the cap plate and the terminal plate, and the thermal-fusion layer includes a plurality of layers including a thermoplastic resin layer.

The plurality of layers of the thermal-fusion layer may further include: a first thermosetting resin layer bonded to the cap plate; and a second thermosetting resin layer bonded to the terminal plate, and the thermoplastic resin layer may be disposed between the first thermosetting resin layer and the second thermosetting resin layer.

The thermoplastic resin layer may melt at a predetermined temperature.

The thermoplastic resin layer may include polypropylene.

The cap plate may include a first chemical conversion coating, and the thermal-fusion layer may contact the first chemical conversion coating.

The cap plate may include stainless steel.

The terminal plate may include a second chemical conversion coating, and the thermal-fusion layer may contact the second chemical conversion coating.

The terminal plate may include aluminum.

The second chemical conversion coating may include chromate.

The terminal plate may include a terminal portion on the cap plate, and a protrusion passing through the through-hole from the terminal portion to be connected to the second electrode.

The thermal-fusion layer may be located between the terminal portion and the cap plate.

A first ventilation channel may be located between the thermal-fusion layer and the protrusion.

A second ventilation channel communicating with the first ventilation channel may be located between the cap plate and the protrusion, and the first ventilation channel and the second ventilation channel may communicate with an inner space of the case.

The case and the cap plate may have a same polarity as the first electrode, and the terminal plate may have a same polarity as the second electrode.

The electrode assembly may further include a first electrode tab extending from the first electrode to be coupled to the case, and a second electrode tab extending from the second electrode to be coupled to the terminal plate.

According to an aspect of one or more embodiments, a rechargeable battery may be provided in which a risk of explosion may be suppressed even if a temperature and pressure are unintentionally increased inside the rechargeable battery.

DESCRIPTION OF REFERENCE DESIGNATORS

Figure 1:
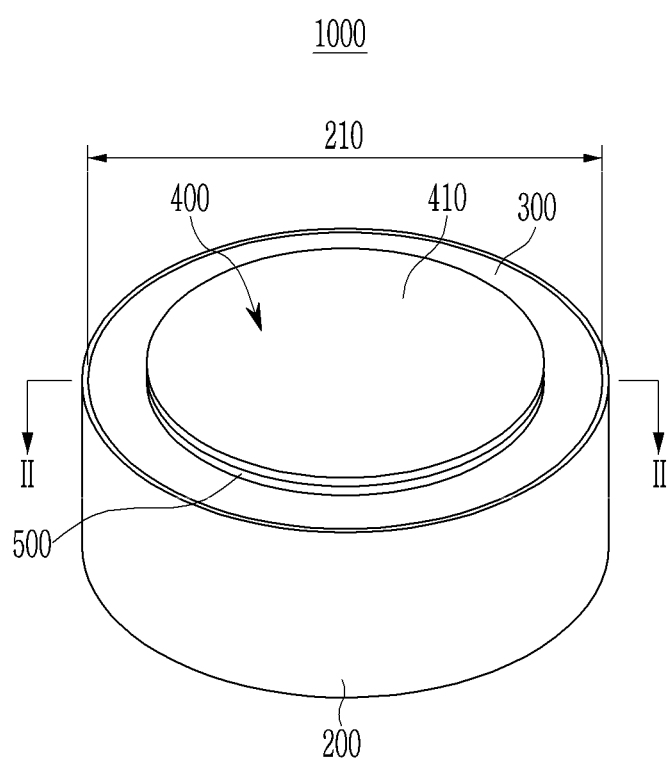
FIG. 1 illustrates a perspective view of a rechargeable battery according to an embodiment.

| | |
|---|---|
| 100: electrode assembly | 200: case |
| 300: cap plate | 400: terminal plate |
| 500: thermal-fusion layer | 510: first thermosetting resin layer |
| 520: second thermosetting resin layer | 530: thermoplastic resin layer |

DETAILED DESCRIPTION

The present invention will be described more fully herein with reference to the accompanying drawings, in which some example embodiments of the invention are shown. As those skilled in the art would realize, the described embodiments may be modified in various different ways, all without departing from the spirit or scope of the present. The drawings and description are to be regarded as illustrative in nature and not restrictive. Like reference numerals designate like elements throughout the specification.

In addition, unless explicitly described to the contrary, it is to be understood that terms such as "comprises," "includes," or "have" used in the present specification specify the presence of stated features, numerals, steps, operations, components, parts, or a combination thereof, but do not preclude the presence or addition of one or more other features, numerals, steps, operations, components, parts, or a combination thereof.

Also, in this specification, it is to be understood that when one component is referred to as being "connected" or "coupled" to another component, it may be connected or coupled directly to the other component or connected or coupled to another component with one or more other components intervening therebetween.

Singular forms are to include plural forms unless the context clearly indicates otherwise.

It is to be understood that, although the terms "first," "second," etc. may be used herein to describe various elements, these elements should not be limited by these terms. These terms are used to distinguish one element from another. For example, a first element could be termed a "second" element, and, similarly, a second element could be termed a "first" element, without departing from the scope of example embodiments of the inventive concept. The terms of a singular form may include plural forms unless the context clearly indicates otherwise.

In addition, terms such as "below," "lower," "above," "upper," and the like are used to describe the relationship of the configurations shown in the drawings. However, the terms are used as a relative concept and are described with reference to the direction indicated in the drawings.

Unless otherwise defined, all terms (including technical and scientific terms) used herein have the same meaning as commonly understood by one of ordinary skill in the art to which the inventive concept pertains. It is also to be understood that terms defined in commonly used dictionaries should be interpreted as having meanings consistent with the meanings in the context of the related art, and are expressly defined herein unless they are interpreted in an ideal or overly formal sense.

Herein, a rechargeable battery according to an embodiment will be described with reference to FIGS. 1 to 3.

The rechargeable battery according to an embodiment is an ultra-small rechargeable battery, and may include a coin cell or a button cell, but the present invention is not limited thereto, and it may include a cylindrical or pin-type cell.

Here, the coin cell or the button cell is a thin coin-type or button-type cell, and may refer to a battery having a ratio (height/diameter) of a height to a diameter of 1 or less, but is not limited thereto. Since the coin cell or the button cell may be cylindrical, a horizontal cross-section may be circular, but the present invention is not limited thereto, and a horizontal cross-section may be oval or polygonal. In this case, the diameter may refer to a maximum distance of the cell based on a horizontal direction of the cell, and the height may refer to a maximum distance (distance from a flat bottom surface thereof to a flat uppermost surface) of the cell based on a vertical direction of the cell.

Figure 2:
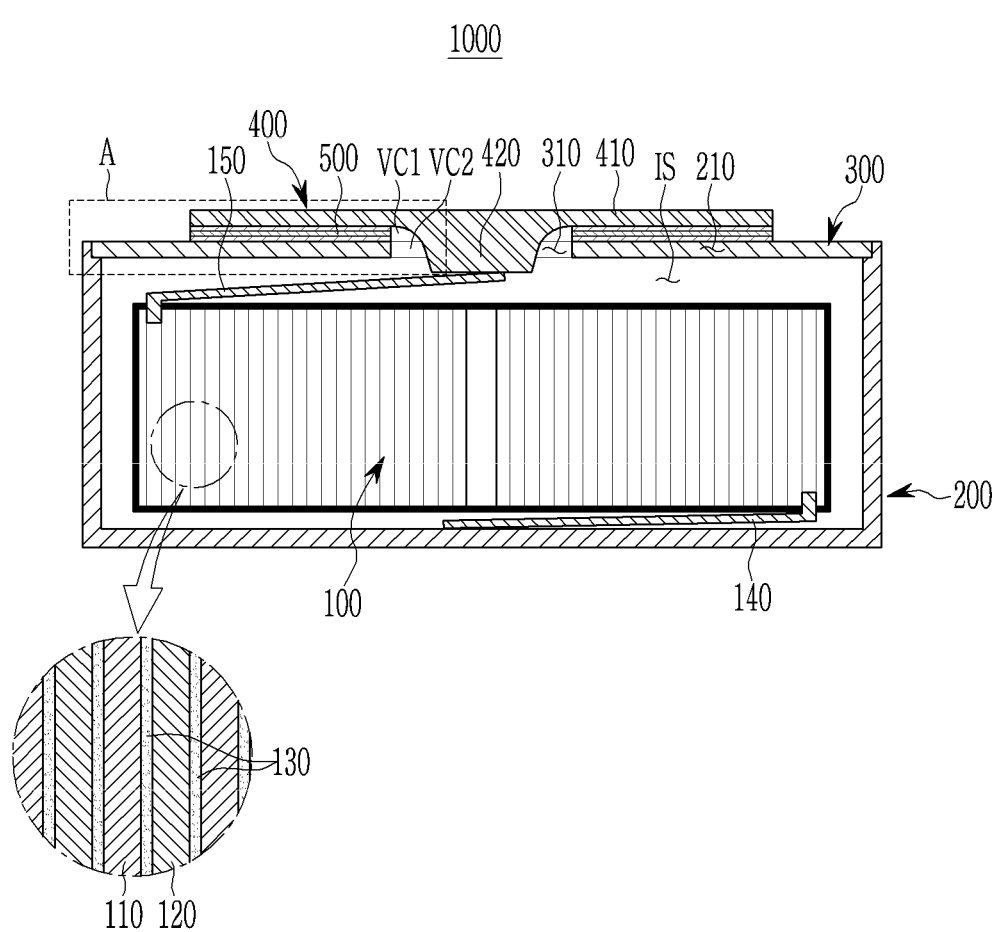
FIG. 2 illustrates a cross-sectional view taken along the line II-II of FIG. 1.

FIG. 1 illustrates a perspective view of a rechargeable battery according to an embodiment; and FIG. 2 illustrates a cross-sectional view taken along the line II-II of FIG. 1.

Referring to FIG. 1 and FIG. 2, a rechargeable battery 1000 according to an embodiment includes an electrode assembly 100, a case 200, a cap plate 300, a terminal plate 400, and a thermal-fusion layer 500.

The electrode assembly 100 is accommodated in the case 200. A lower portion of the electrode assembly 100 faces a bottom portion of the case 200, and an upper portion of the electrode assembly 100 faces the cap plate 300 covering an opening 210 of the case 200, and the terminal plate 400. The upper and lower portions of the electrode assembly 100 may have planar shapes parallel to each other, but are not limited thereto.

The electrode assembly 100 includes a first electrode 110, a second electrode 120, a separator 130, a first electrode tab 140, and a second electrode tab 150.

The first electrode 110 and the second electrode 120 are spaced apart from each other, and the separator 130 including an insulating material is disposed between the first electrode 110 and the second electrode 120. In an embodiment, the first electrode 110 may be a cathode and the second electrode 120 may be an anode, but the present invention is not limited thereto, and, in another embodiment, the first electrode 110 may be an anode and the second electrode 120 may be a cathode.

In an embodiment, the first electrode 110 has a shape of a band extending in a direction, and includes a cathode coated region that is a region where a cathode active material layer is coated to a current collector of a metal foil (for example, a Cu foil), and a cathode uncoated region that is a region where an active material is not coated. The cathode uncoated region may be disposed at an end portion in an extending direction of the first electrode 110.

In an embodiment, the second electrode 120 has a band shape that is spaced apart from the first electrode 110 to extend in a direction with the separator 130 interposed therebetween, and includes an anode coated region that is a region where an anode active material layer is coated to a current collector of a metal foil (for example, an Al foil), and an anode uncoated region that is a region where an active material is not coated. The anode uncoated region may be disposed at an end portion in an extending direction of the second electrode 120.

The separator 130 extends in a direction between the first electrode 110 and the second electrode 120 to prevent or substantially prevent a short circuit between the first electrode 110 and the second electrode 120.

In an embodiment, the first electrode 110, the separator 130, and the second electrode 120 are sequentially stacked and wound in a jelly roll shape, but are not limited thereto, and may be formed in any of various known shapes. Each of the first electrode 110, the second electrode 120, and the separator 130 may include any of various known materials.

The first electrode tab 140 extends from the first electrode 110 of the electrode assembly 100 to the case 200. In an embodiment, the first electrode tab 140 is coupled to a bottom portion of the case 200 to connect the first electrode 110 and the case 200. The first electrode tab 140 contacts the first electrode 110 and the case 200. By the first electrode tab 140, the case 200 has a same polarity as that of the first electrode 110 (for example, the cathode).

The second electrode tab 150 extends from the second electrode 120 of the electrode assembly 100 to the terminal plate 400. In an embodiment, the second electrode tab 150 is coupled to a protrusion 420 of the terminal plate 400 to connect the second electrode 120 and the terminal plate 400. The second electrode tab 150 contacts the second electrode 120 and the terminal plate 400. By the second electrode tab 150, the terminal plate 400 has a same polarity as that of the second electrode 120 (for example, the anode).

In an embodiment, a center pin penetrating a center of the electrode assembly 100 in a vertical direction is positioned at a center portion of the electrode assembly 100, and the center pin may support the first electrode tab 140 and the second electrode tab 150, but is not limited thereto.

In an embodiment, the case 200 is coupled to the first electrode 110 of the electrode assembly 100 to house the electrode assembly 100. The case 200 includes the opening 210 that exposes an upper portion of the electrode assembly 100. The bottom portion of the case 200 is connected to the first electrode 110 of the electrode assembly 100 by the first electrode tab 140 to have the same polarity as that of the first electrode 110 (for example, the cathode). In an embodiment, the case 200 has a cylinder shape for accommodating the electrode assembly 100 of a jelly roll shape, but is not limited thereto, and may have any of various known shapes. The case 200 may accommodate any of various known electrolyte solutions along with the electrode assembly 100. In an embodiment, an outer surface of the case 200 may be a cathode terminal of the rechargeable battery 1000. In this case, an outer surface of the terminal plate 400 may be an anode terminal of the rechargeable battery 1000. The opening 210 of the case 200 is covered by the cap plate 300 and the terminal plate 400.

The cap plate 300 is combined with the case 200 to cover an outer area of the opening 210. The cap plate 300 includes a through-hole 310 that exposes a central area of the opening 210. In an embodiment, the cap plate 300 is directly coupled to a side wall of the case 200 in which the opening 210 of the case 200 is formed by a welding process to cover the outer area of the opening 210. In an embodiment, the cap plate 300 has a ring shape by the through-hole 310 formed in a central portion thereof, but is not limited thereto. In an embodiment, the cap plate 300 is combined with the case 200 to have the same polarity as that of the first electrode 110 (for example, the cathode). In an embodiment, the cap plate 300 contains stainless steel, but is not limited thereto, and may contain a metal, such as any of aluminum, nickel, and copper.

The terminal plate 400 is insulation-bonded to the cap plate 300 to cover the through-hole 310 of the cap plate 300. In an embodiment, the terminal plate 400 is disposed on the cap plate 300, but is not limited thereto, and may be disposed between the cap plate 300 and the electrode assembly 100. The terminal plate 400 covers the central area of the opening 210 of the case 200 exposed by the through-hole 310 of the cap plate 300. In an embodiment, the terminal plate 400 covers the central area of the opening 210, and the cap plate 300 covers the outer area of the opening 210, and, thus, the opening 210 of the case 200 is completely covered by the terminal plate 400 and the cap plate 300. The terminal plate 400 is coupled to the second electrode tab 150 of the electrode assembly 100 to be connected to the second electrode 120 of the electrode assembly 100. The terminal plate 400 has the same polarity as that of the second electrode 120 (for example, the anode).

In an embodiment, the terminal plate 400 includes a terminal portion (or flange portion) 410 and the protrusion 420.

The terminal portion 410 is disposed on the cap plate 300 and overlaps the cap plate 300. In an embodiment, the terminal portion 410 has a larger area than the protrusion 420. For example, the terminal portion 410 may have a larger diameter than the protrusion 420. A lower surface of the terminal portion 410 is in contact with the thermal-fusion layer 500, and the terminal portion 410 is insulation-bonded to the cap plate 300 by the thermal-fusion layer 500.

The protrusion 420 protrudes from the terminal portion 410 corresponding to the through-hole 310 of the cap plate 300 to pass through the through-hole 310. A lower surface of the protrusion 420 is in contact with the second electrode tab 150. As the protrusion 420 is coupled with the second electrode tab 150, the terminal plate 400 has the same polarity as that of the second electrode 120.

In an embodiment, the terminal plate 400 contains aluminum, but is not limited thereto, and may contain a metal, such as any of stainless steel, nickel, and copper.

The thermal-fusion layer 500 is disposed between the cap plate 300 and the terminal portion 410 of the terminal plate 400, and insulation-bonds the cap plate 300 and the terminal plate 400. The thermal-fusion layer 500 contains an insulating material, and insulates between the cap plate 300 and the terminal plate 400. In an embodiment, the thermal-fusion layer 500 is thermally fusion-bonded between the cap plate 300 and the terminal portion 410 of the terminal plate 400 by heat or a laser beam. The thermal bonding layer 500 may include any of various known materials that may insulation-bond the cap plate 300 and the terminal plate 400. Since the cap plate 300 and the terminal plate 400 are bonded by the thermal-fusion layer 500, the opening 210 of the case 200 in which the electrode assembly 100 is accommodated is completely sealed by the cap plate 300, the terminal plate 400, and the thermal-fusion layer 500.

Figure 3:
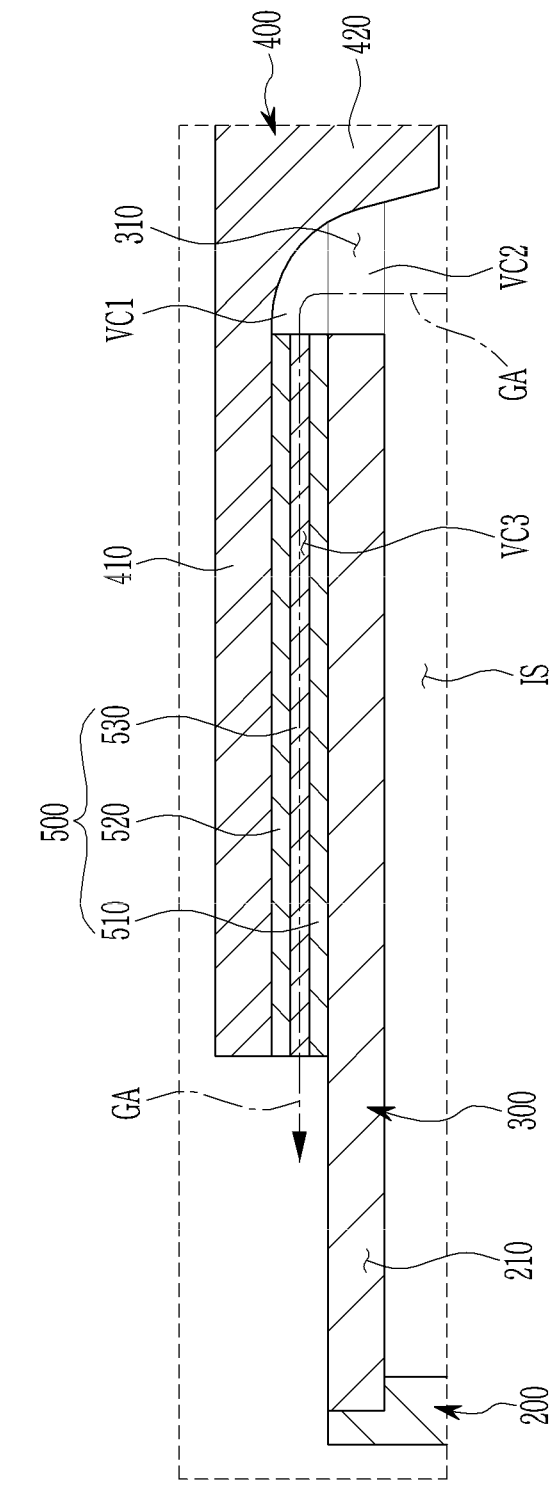
FIG. 3 illustrates a cross-sectional view of a region "A" of FIG. 2.

FIG. 3 illustrates a cross-sectional view of a region "A" of FIG. 2.

Referring to FIG. 2 and FIG. 3, in an embodiment, the thermal-fusion layer 500 includes a plurality of layers. In an embodiment, the thermal-fusion layer 500, which is formed as a plurality of layers, includes a first thermosetting resin layer 510, a second thermosetting resin layer 520, and a thermoplastic resin layer 530.

The first thermosetting resin layer 510 is bonded to the cap plate 300. The first thermosetting resin layer 510 is cured by heat, and includes any of various known thermosetting resins, such as phenol resin, urea resin, melamine resin, epoxy resin, and polyester resin. The first thermosetting resin layer 510 is disposed between the cap plate 300 and the thermoplastic resin layer 530 when manufacturing the rechargeable battery 1000, and then cured by heat to bond the thermoplastic resin layer 530 and the cap plate 300.

The second thermosetting resin layer 520 is bonded to the terminal plate 400. The second thermosetting resin layer 520 is cured by heat, and includes any of various known thermosetting resins, such as phenol resin, urea resin, melamine resin, epoxy resin, and polyester resin. In an embodiment, the second thermosetting resin layer 520 may include the same material as that of the first thermosetting resin layer 510, but is not limited thereto, and may include a different material from that of the first thermosetting resin layer 510. The second thermosetting resin layer 520 is disposed between the terminal plate 400 and the thermoplastic resin layer 530 when manufacturing the rechargeable battery 1000, and then cured by heat to bond the thermoplastic resin layer 530 and the terminal plate 400.

The thermoplastic resin layer 530 is disposed between the first thermosetting resin layer 510 and the second thermosetting resin layer 520. The thermoplastic resin layer 530 bonds the first thermosetting resin layer 510 and the second thermosetting resin layer 520. The thermoplastic resin layer 530 includes any of various known thermoplastic resins. For example, the thermoplastic resin layer 530 may include a polypropylene resin, but is not limited thereto, and may include any of polystyrene, polyethylene, and polyvinyl chloride resins. In a state in which the first thermosetting resin layer 510 and the second thermosetting resin layer 520 are bonded when manufacturing the rechargeable battery 1000, the thermoplastic resin layer 530 does not melt by the heat for curing the first thermosetting resin layer 510 and the second thermosetting resin layer 520, and is bonded to the first thermosetting resin layer 510 and the second thermosetting resin layer 520. In an embodiment, the thermoplastic resin layer 530 melts at a predetermined temperature. Here, the predetermined temperature at which the thermoplastic resin layer 530 melts may be a temperature exceeding the temperature of heat for curing the first thermosetting resin layer 510 and the second thermosetting resin layer 520, but is not limited thereto.

A first ventilation channel VC1, which is a separation space, is disposed between the thermal-fusion layer 500 and the protrusion 420 of the terminal plate 400, and the first ventilation channel VC1 surrounds an outer circumferential edge of an upper portion of the protrusion 420 in a vertical direction of the protrusion 420. A second ventilation channel VC2, which is a separation space, is disposed between the cap plate 300 and the protrusion 420 of the terminal plate 400, and the second ventilation channel VC2 surrounds an outer circumferential edge of a lower portion of the protrusion 420 in a vertical direction of the protrusion 420. The first ventilation channel VC1 and the second ventilation channel VC2 communicate with each other, and the first ventilation channel VC1 and the second ventilation channel VC2 communicate with an inner space IS of the case 200.

The thermal-fusion layer 500 seals the inner space IS, the second ventilation channel VC2, and the first ventilation channel VC1 of the case 200 that communicate with each other.

Referring to FIG. 3, when an event such as an unintended short circuit between the first electrode 110 and the second electrode 120 of the electrode assembly 100 in the inner space IS of the case 200 of the rechargeable battery 1000 occurs, a temperature of the inner space IS of the case 200 for accommodating the electrode assembly 100 and an electrolyte increases, and, thus, a gas GA is generated in the inner space IS of the case 200 to increase a pressure of the inner space IS of the case 200.

At this time, the temperature of the inner space IS of the case 200 rises because of generated heat, and the thermoplastic resin layer 530 of the thermal-fusion layer 500 may be melted by the generated heat. When the thermoplastic resin layer 530 for bonding the first thermosetting resin layer 510 and the second thermosetting resin layer 520 of the thermal-fusion layer 500 melts to a fluid form by the heat, the high pressure gas GA generated in the inner space IS of the case 200 passes through the second ventilation channel VC2 and the first ventilation channel VC1 from the inner space IS of the case 200 to push out the thermoplastic resin layer 530 of the fluid form from the first thermosetting resin layer 510 and the second thermosetting resin layer 520, and the gas GA having a high temperature and pressure generated in the inner space IS of the case 200 passes through the second ventilation channel VC2 and the first ventilation channel VC1 from the inner space IS of the case 200 to be discharged to the outside through a third ventilation channel VC3 formed between the first thermosetting resin layer 510 and the second thermosetting resin layer 520.

As described above, even if a temperature and pressure rise due to an unintended event in the inner space IS of the rechargeable battery 1000, since the thermoplastic resin layer 530 included in the thermal-fusion layer 500 is melted by heat to form the third ventilation channel VC3 between the first thermosetting resin layer 510 and the second thermosetting resin layer 520, the gas GA having a high temperature and pressure generated in the inner space IS passes through the second ventilation channel VC2 and the first ventilation channel VC1 from the inner space IS to be discharged to the outside through the third ventilation channel VC3, thereby suppressing a risk of explosion of the rechargeable battery 1000.

That is, even if the temperature and pressure inside the rechargeable battery 1000 unintentionally increase, the rechargeable battery 1000 may suppress a risk of explosion.

Herein, a rechargeable battery according to another embodiment will be described with reference to FIG. 4 and FIG. 5.

Herein, different elements from those of the rechargeable battery according to the above-described embodiment will be mainly described.

Figure 4:
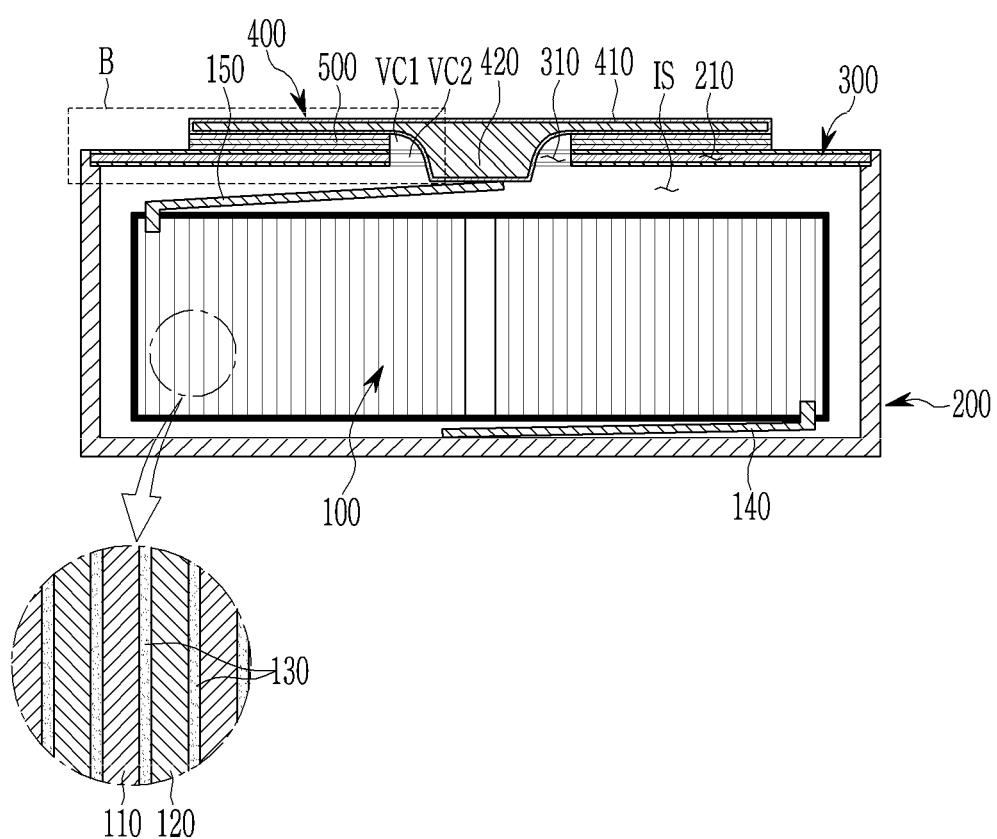
FIG. 4 illustrates a cross-sectional view of a rechargeable battery according to another embodiment.
Figure 5:
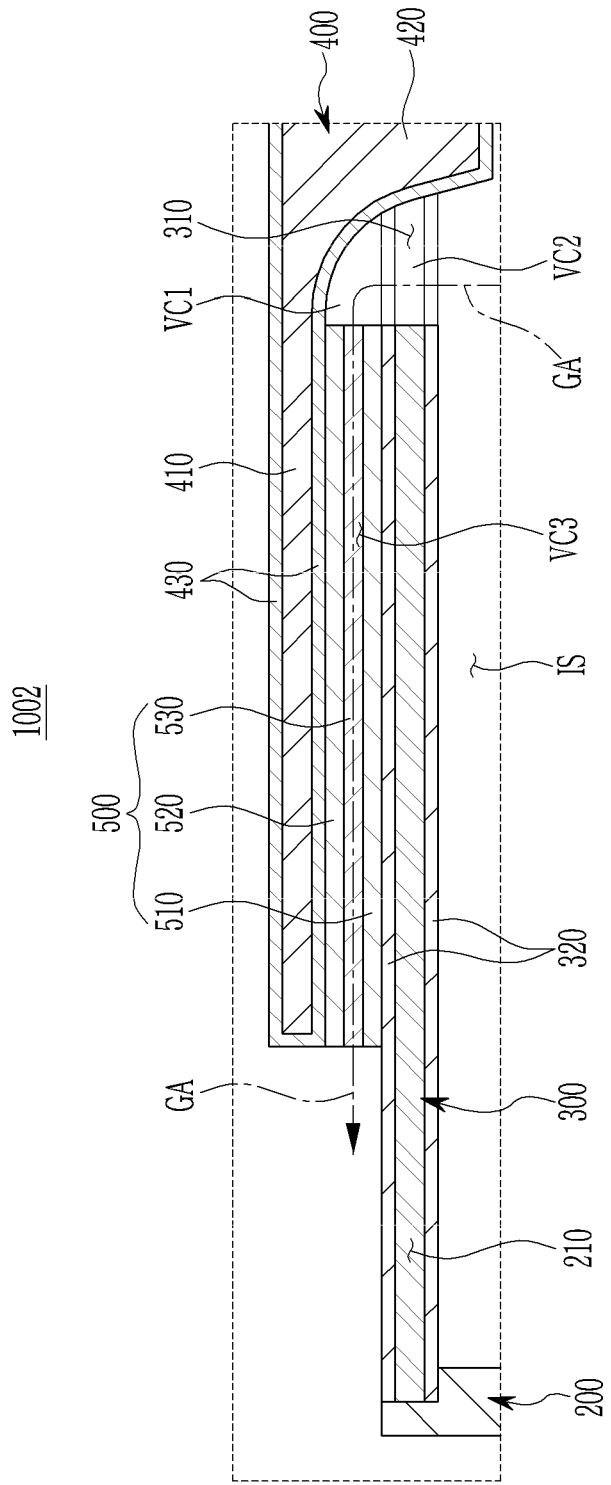
FIG. 5 illustrates a cross-sectional view of a region "B" of FIG. 4.

FIG. 4 illustrates a cross-sectional view of a rechargeable battery according to another embodiment; and FIG. 5 illustrates a cross-sectional view of a region "B" of FIG. 4.

Referring to FIG. 4 and FIG. 5, a rechargeable battery 1002 according to another embodiment includes an electrode assembly 100, a case 200, a cap plate 300, a terminal plate 400, and a thermal-fusion layer 500.

In an embodiment, the cap plate 300 contains stainless steel, and includes a first chemical conversion coating 320 coated on a surface thereof. The first chemical conversion coating 320 includes any of chemical conversion coatings formed by various known chemical conversion treatments, such as a chromate treatment or a phosphoric acid treatment.

In an embodiment, the terminal plate 400 contains aluminum, and includes a second chemical conversion coating 430 coated on a surface thereof. In an embodiment, the second chemical conversion coating 430 includes chromate formed by chromate treatment. However, the second chemical conversion coating 430 may include any of chemical conversion coatings formed by various known chemical conversion treatments, such as a phosphoric acid treatment.

The thermal-fusion layer 500 contacts the first chemical conversion coating 320 and the second chemical conversion coating 430 between the cap plate 300 and the terminal portion 410 of the terminal plate 400.

The first thermosetting resin layer 510 of the thermal-fusion layer 500 is bonded to the first chemical conversion coating 320 of the cap plate 300, and the second thermosetting resin layer 520 is bonded to the second chemical conversion coating 430 of the terminal plate 400.

Since corrosion resistance of the cap plate 300 and the terminal plate 400 is improved by the first chemical conversion coating 320 and the second chemical conversion coating 430, the first and second thermosetting resin layers 510 and 520 of the thermal-fusion layer 500 for bonding the cap plate 300 and the terminal plate 400 may be prevented or substantially prevented from being separated from each of the cap plate 300 and the terminal plate 400 due to surface corrosion of the cap plate 300 and the terminal plate 400.

Referring to FIG. 5, when an event such as an unintended short circuit between the first electrode 110 and the second electrode 120 of the electrode assembly 100 in the inner space IS of the case 200 of the rechargeable battery 1002 occurs, a temperature of the inner space IS of the case 200 for accommodating the electrode assembly 100 and an electrolyte increases, and a gas GA is generated in the inner space IS of the case 200 to increase a pressure of the inner space IS of the case 200.

At this time, the temperature of the inner space IS of the case 200 rises because of generated heat, and the thermoplastic resin layer 530 of the thermal-fusion layer 500 may be melted by the generated heat. When the thermoplastic resin layer 530 for bonding the first thermosetting resin layer 510 and the second thermosetting resin layer 520 of the thermal-fusion layer 500 melts into a fluid form by the heat, the high pressure gas GA generated in the inner space IS of the case 200 passes through the second ventilation channel VC2 and the first ventilation channel VC1 from the inner space IS of the case 200 to push out the thermoplastic resin layer 530 of the fluid form from the first thermosetting resin layer 510 and the second thermosetting resin layer 520, and the gas GA having a high temperature and pressure generated in the inner space IS of the case 200 passes through the second ventilation channel VC2 and the first ventilation channel VC1 from the inner space IS of the case 200 to be discharged to the outside through the third ventilation channel VC3 formed between the first thermosetting resin layer 510 and the second thermosetting resin layer 520.

In addition, since the corrosion resistance of the cap plate 300 and the terminal plate 400 is improved by the first chemical conversion coating 320 and the second chemical conversion coating 430, the first and second thermosetting resin layers 510 and 520 of the thermal-fusion layer 500 for bonding the cap plate 300 and the terminal plate 400 may be prevented or substantially prevented from being separated from each of the cap plate 300 and the terminal plate 400 due to surface corrosion of the cap plate 300 and the terminal plate 400, and, thus, a life span of the rechargeable battery 1002 is improved.

That is, even if the temperature and pressure inside the rechargeable battery 1002 unintentionally increase, the rechargeable battery 1002 in which a risk of explosion is reduced and a life span is improved is provided.

While this invention has been described in connection with what are presently considered to be some example embodiments, it is to be understood that the invention is not limited to the disclosed embodiments, but, on the contrary, is intended to cover various modifications and equivalent arrangements included within the spirit and scope of the appended claims.

What is claimed is:

1. A rechargeable battery comprising:
   an electrode assembly comprising a first electrode, a second electrode, and a separator between the first electrode and the second electrode;
   a case connected to the first electrode and accommodating the electrode assembly, and comprising an opening to receive the electrode assembly;
   a cap plate coupled to the case to cover an outer area of the opening, and comprising a through-hole to expose a central area of the opening;
   a terminal plate covering the through-hole and connected to the second electrode; and
   a thermal-fusion layer arranged between the cap plate and the terminal plate and insulation-bonding the cap plate and the terminal plate,
   wherein the thermal-fusion layer comprises a plurality of layers comprising a thermoplastic resin layer,
   wherein the terminal plate comprises:
   a terminal portion on the cap plate; and
   a protrusion passing through the through-hole from the terminal portion to be connected to the second electrode,
   wherein the thermal-fusion layer is located between the terminal portion and the cap plate, and
   wherein a first open space is located between the thermal-fusion layer and the protrusion,
   a second open space communicating with the first open space is located between the cap plate and the protrusion,
   the first open space and the second open space communicate with an inner space of the case, and
   the thermoplastic resin layer is configured to melt at a temperature to form a ventilation channel together with the first and second open spaces from the inner space of the case to an outside of the rechargeable battery to pass a gas therethrough.

2. The rechargeable battery of claim 1, wherein the plurality of layers of the thermal-fusion layer further comprises:
   a first thermosetting resin layer bonded to the cap plate; and
   a second thermosetting resin layer bonded to the terminal plate, and
   the thermoplastic resin layer is located between the first thermosetting resin layer and the second thermosetting resin layer.

3. The rechargeable battery of claim 1, wherein the thermoplastic resin layer melts at a predetermined temperature.

4. The rechargeable battery of claim 1, wherein the thermoplastic resin layer comprises polypropylene.

5. The rechargeable battery of claim 1, wherein
   the cap plate comprises a first chemical conversion coating, and
   the thermal-fusion layer contacts the first chemical conversion coating.

6. The rechargeable battery of claim 5, wherein the cap plate comprises stainless steel.

7. The rechargeable battery of claim 5, wherein
   the terminal plate comprises a second chemical conversion coating, and
   the thermal-fusion layer contacts the second chemical conversion coating.

8. The rechargeable battery of claim 7, wherein the terminal plate comprises aluminum.

9. The rechargeable battery of claim 7, wherein the second chemical conversion coating comprises chromate.

10. The rechargeable battery of claim 1, wherein
    the case and the cap plate have a same polarity as the first electrode, and
    the terminal plate has a same polarity as the second electrode.

11. The rechargeable battery of claim 1, wherein the electrode assembly further comprises:
    a first electrode tab extending from the first electrode to be coupled to the case; and
    a second electrode tab extending from the second electrode to be coupled to the terminal plate.

* * * * *